United States Patent [19]

Gembarowski

[11] Patent Number: 4,811,283

[45] Date of Patent: Mar. 7, 1989

[54] RECOVERY SYSTEM FOR QUEUED DATA TRANSFER SYNCH. LOSS UTILIZING ERROR FLAG AND STATUS MEMORIES

[75] Inventor: Mark L. Gembarowski, Ft. Collins, Colo.

[73] Assignee: Hewlett-Packard Company, Palo Alto, Calif.

[21] Appl. No.: 740,105

[22] Filed: May 31, 1985

[51] Int. Cl.$^4$ .................................... G06F 11/00
[52] U.S. Cl. .................................... 364/900; 371/47
[58] Field of Search ... 364/200 MS File, 900 MS File, 364/184; 371/47; 370/100, 103, 104, 105; 375/107, 109

[56] References Cited

U.S. PATENT DOCUMENTS

| | | | |
|---|---|---|---|
| 4,524,445 | 6/1985 | Fujii | 371/47 |
| 4,589,066 | 5/1986 | Lam et al. | 364/200 |
| 4,638,227 | 1/1987 | Katayama et al. | 364/184 |

Primary Examiner—Raulfe B. Zache
Assistant Examiner—Ayni Mohamed
Attorney, Agent, or Firm—Jeffery B. Fromm

[57] ABSTRACT

An apparatus provides for recovery from a loss of synchronization in a queued data transfer between a controller and a peripheral device. The apparatus eliminates the need for a timeout mechanism within the controller. A method of operating the apparatus provides proper sequencing following a loss of synchronization as well as the correct status report for the data transfer which immediately preceded the loss of synchronization.

6 Claims, 5 Drawing Sheets

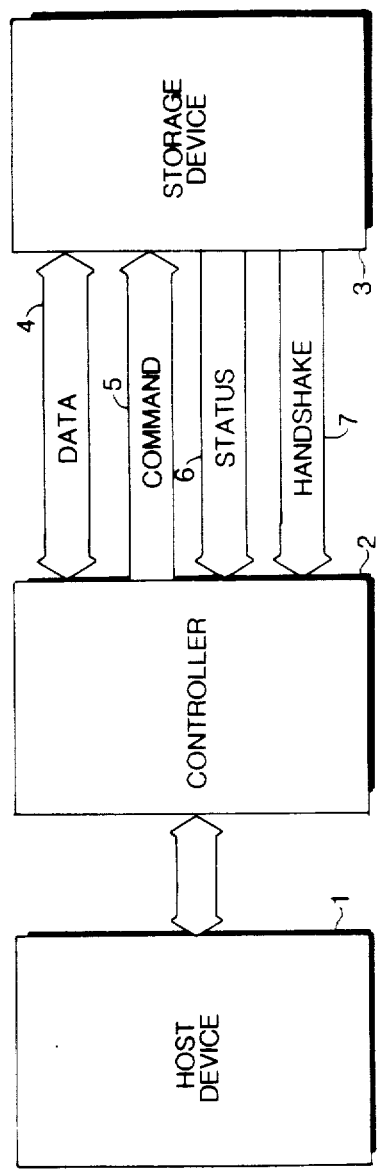
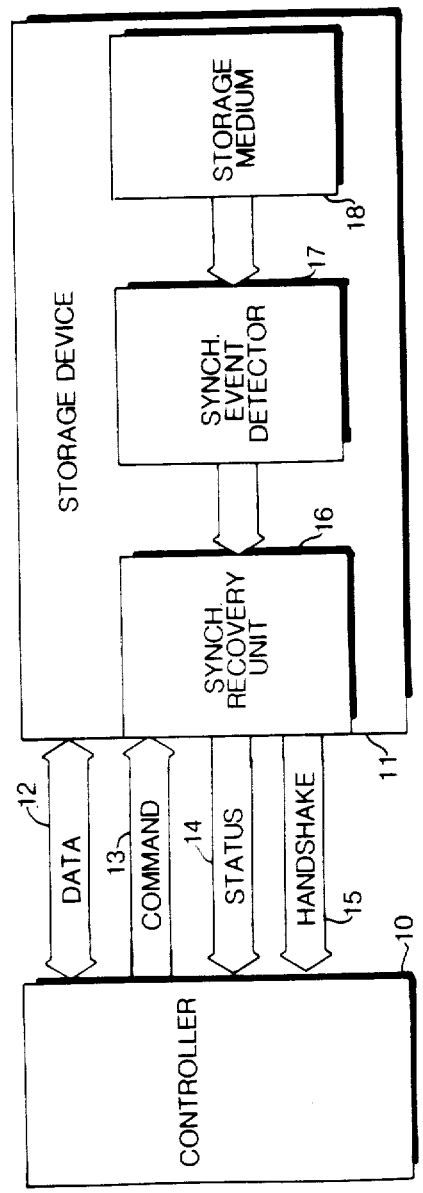

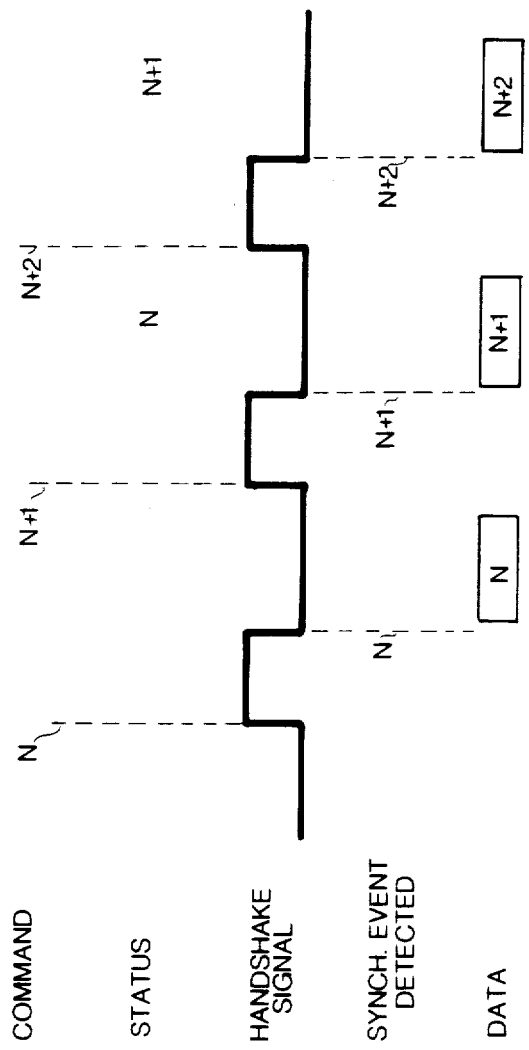

RECOVERY SYSTEM FOR QUEUED DATA TRANSFER SYNCH. LOSS UTILIZING ERROR FLAG AND STATUS MEMORIES

BACKGROUND OF THE INVENTION

Data transfers between host devices and peripheral devices such as magnetic tape drives or disc drives are often executed by a controller. The controller may act with the host to "queue" commands which are intended for the peripheral device. Command queueing results in queued data transfers and, since most peripheral devices operate much more slowly than their hosts, the efficiency of the host is significantly improved.

In a queued data transfer, the controller issues a first command from the queue to the peripheral device. Subsequently, the controller issues a second command and, when execution commences, receives a status report corresponding to the first command. Thus, the controller issues the second command before it is certain that the first command was properly executed. In one sense, the controller is always one command "ahead" of the peripheral device. This technique inherently requires two separate buffers or memories for the storage of status reports. The necessity for two buffers becomes apparent when it is realized that a given status report cannot be transmitted to the controller until execution of the next subsequent command begins. For this reason, one status buffer must store the report for the immediately preceding command while the other status buffer remains ready to receive the report for the command being executed.

The controller and peripheral device must be synchronized in order to maintain the proper status report sequence. The peripheral device may detect synchronization "events" which are dispersed throughout the storage medium or may rely on another type of event. By identifying the synchronization events and comparing them to preselected "target" events, the peripheral device determines when a data transfer may begin and when a status report is available. The peripheral device may transmit this information to the controller through a handshake line or other control device.

Since the controller normally sends a second command without having received a status report for the first, problems arise when there is a loss of synchronization between the controller and peripheral device. For example, if the peripheral device fails to detect a particular synchronization event but does detect the events immediately preceding and following it, the status reports will become incorrectly sequenced as they are transmitted to the controller. A second problem is accounting for the data transfer which immediately preceded the loss of synchronization. If the controller cannot recover the status report for this transfer, it will have to be redone regardless of whether it was valid.

A previous solution to the problem of synchronization loss was to provide the controller with a "timeout" mechanism. This mechanism simply measured the duration of the data transfer and, if a preselected period expired before the occurrence of an expected synchronization event, then a loss of synchronization was assumed. The disadvantage of this technique is that the controller cannot obtain the status report for the transfer which immediately preceded the loss of synchronization, even though that transfer may have been valid. There is also the inherent disadvantage of having to incorporate the timeout mechanism into the controller.

BRIEF SUMMARY OF THE INVENTION

The present invention provides for recovery and proper status report sequencing following a loss of synchronization in a queued data transfer between a controller and a peripheral device. The present invention provides the correct status report for the data transfer which immediately preceded the loss of synchronization and eliminates the need for a timeout mechanism within the controller.

DESCRIPTION OF THE DRAWINGS

FIG. 1 is a block diagram of a queued data system known in the prior art.

FIG. 2 is a block diagram of a queued data system having a storage device which incorporates a synchronization recovery unit.

FIG. 3 is a timing diagram showing the normal operation of the queued data system of FIG. 2.

DETAILED DESCRIPTION OF THE INVENTION

Figure 4:
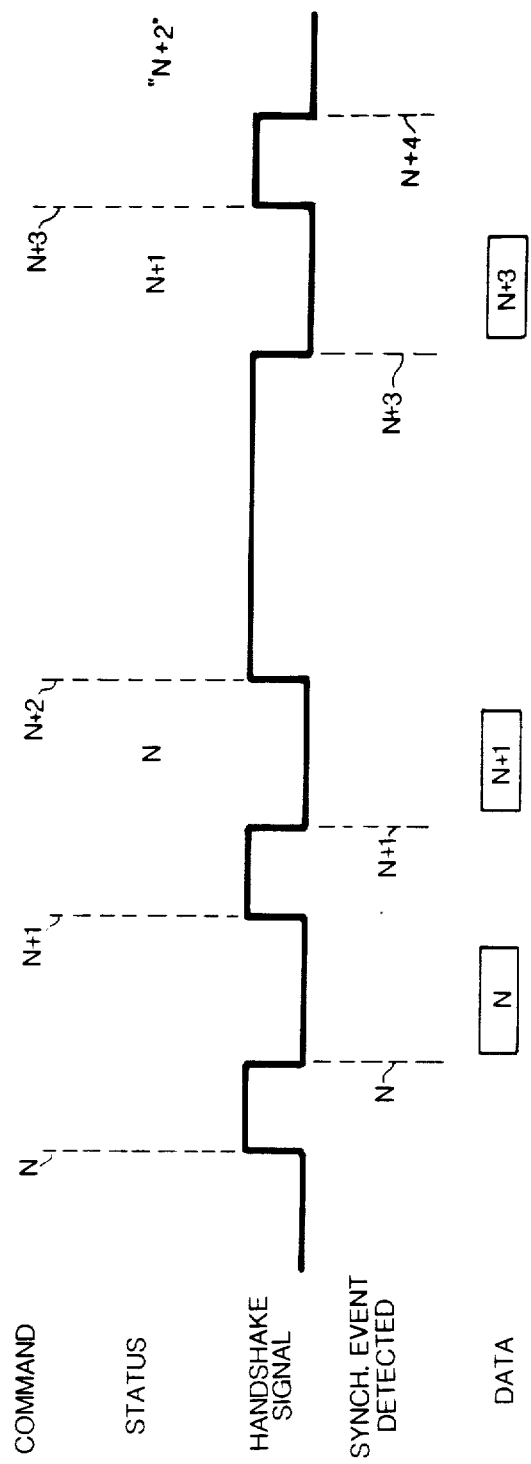
FIG. 4 is a timing diagram showing a loss of synchronization in th queued data system of FIG. 2.

FIG. 1 depicts a queued data system known in the prior art in which a host device 1 employs a controller 2 as an interface to a storage device 3. The host device 1 may comprise, for example, a computer. The storage device 3 may comprise a magnetic tape drive, disc drive, computer or other device. The controller 2 is connected to the storage device 3 by a bidirectional data line 4, a command line 5, a status line 6 and a handshake line 7. The controller 2 operates to queue commands issued by the host device 1. From the queue, the controller 2 issues commands through the command line 5. The commands may request that the storage device 3 either store or retrieve information. Subsequently, the controller 2 receives status reports through the status line 6. These status reports correspond to previously executed commands. The storage device 3 uses the handshake line 7 to signal the controller 2 when data may be transferred and when a status report is available.

FIG. 2 depicts a queued data system in which a storage device incorporates a synchronization recovery unit. A controller 10 is connected to a storage device 11 by a bidirectional data line 12, a command line 13, a status line 14 and a handshake line 15. The storage device 11 incorporates a synchronization recovery unit 16, which is connected to a synchronization event detector 17. The event detector 17 is connected to a storage medium 18. The storage medium 18 may comprise, for example, a magnetic tape or disc. The event detector 17 may be readily implemented by a logic designer having ordinary skill in the art to detect a particular type of synchronization event. The type of synchronization event is usually a characteristic of the storage medium 18. For example, a floppy disc may provide a "header" as the synchronization event whereas a magnetic tape may provide an interblock "gap".

The detailed operation of the system shown in FIG. 2 may be understood first with reference to FIG. 3, which is a timing diagram of a normal queued data transfer. Referring now to both FIG. 2 and FIG. 3, when the controller 10 transmits a command N through the command line 13, the storage device 11 asserts a handshake signal on the handshake line 15 to prevent the controller 10 from immediately issuing another command. Subsequently, the event detector 17 searches for and detects the occurrence a "target" synchronization event N, which is associated with the data requested by command N. The storage device 11 then de-asserts the handshake signal to allow the transfer of data N. Subsequently, the controller 10 transmits a command N+1 and the cycle begins again.

When the storage device 11 de-asserts the handshake signal to allow transfer of data N+1, a status report N is transmitted to the controller 10 through the status line 14. Status report N corresponds to the previously executed command N and indicates whether the transfer of data N was successful. Similarly, when data N+2 is being transferred, a status report N+1 is transmitted to the controller 10. Thus, during normal operation of the system shown in FIG. 2, the transfer of data for a particular command cannot begin until a target synchronization event is found and identified. Also, the status report for any particular command is not transmitted to the controller until the data transfer for the next consecutive command begins.

FIG. 4 is a timing diagram illustrating a loss of synchronization within the queued data system shown in FIG. 2. Referring now to both FIG. 2 and FIG. 4, a command N is transmitted by the controller 10 and the handshake signal is asserted by the storage device 11. A target synchronization event N is detected, the handshake signal is de-asserted and data N, which was requested by command N, is transferred. Subsequently, a command N+1 is transmitted by the controller 10, the handshake signal is asserted and a target synchronization event N+1 is detected. The handshake signal is de-asserted, data N+1 is transferred and a status report N corresponding to command N is transmitted to the controller 10. A command N+2 is then transmitted by the controller 10. The event detector 17, however, fails to detect the target synchronization event N+2, but instead detects event N+3. Syncronization event N+3 may be the event which sequentially follows event N+2 or any subsequent event. In other words, there is an error when either a single event or a series of events is missed. The failure to detect a particular event may be caused by an incorrect address, foreign material on the magnetic head or storage medium, data overrun or the like.

Commands which are executed subsequent to the missing synchronization event will not be matched with their correct synchronization events. Thus, as command N+3 is received and the handshake signal is asserted, synchronization event N+3 has already passed and is not available. The event detector 17 will either detect event N+4, which is incorrect, or otherwise reach an error condition by searching for event N+3. Similarly, all subsequent status reports will become improperly sequenced. For example, the status report labelled "N+2" in FIG. 4 is acutally the status report for data N+3. The controller 10, however, is unaware of the missing synchronization event and assumes that report "N+2" is in fact the status report for command N+2.

Figure 5:
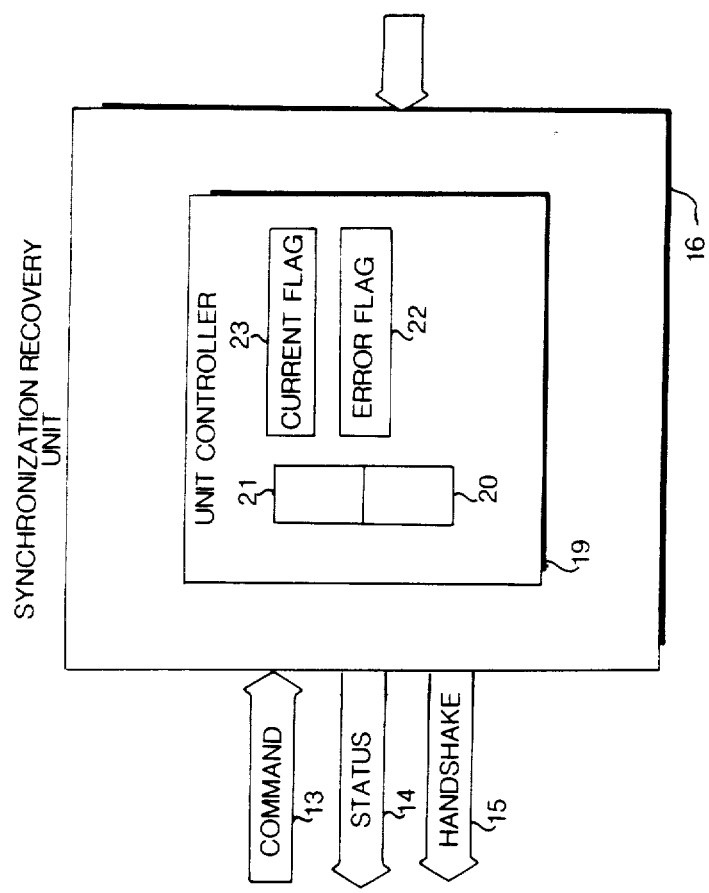
FIG. 5 is a diagram of the preferred embodiment of the synchronization recovery unit of FIG. 2 constructed in accordance with the present invention.

FIG. 5 is a detailed diagram of the preferred embodiment of the synchronization recovery unit shown in FIG. 2 constructed in accordance with the present invention. The recovery unit 16 incorporates a unit controller 19, an error flag 22, a current flag 23 and two status memories 20 and 21. The unit controller 19 may comprise, for example, any of a number of commercially available microprocessors such as the Motorola 6805. Also, the unit controller 19 may be implemented as an algorithmic state machine or other logical controller by a logic designer having ordinary skill in the art. The status memories 20 and 21, the error flag 22 and the current flag 23 may comprise, for example, areas of random access memory, registers within a microprocessor or any other device into which the unit controller 19 may store and retrieve information.

As explained in detail below, the status memories 20 and 21 are used to store status reports which indicate whether previously received commands were successfully executed. The current flag 23 is a "pointer" or indicator which the unit controller 19 operates in determining which status memory should receive and store a particular status report. Thus, at any given time, whichever status memory the current flag 23 points to is referred to hereinafter as the "current" status memory while the other status memory is referred to as the "not current" status memory. The current flag 23 toggles in response to the occurrence of a preselected synchronization event. The result of this toggling is the storage of a given status report in one of the status memories followed by the storage of the next consecutive status report in the alternate status memory. The unit controller 19 also utilizes the current flag 23 to determine from which status memory a status report should be transmitted to the controller 10. The error flag 22 is an indicator which is responsive to the occurrence of a loss of synchronization.

Figure 6:
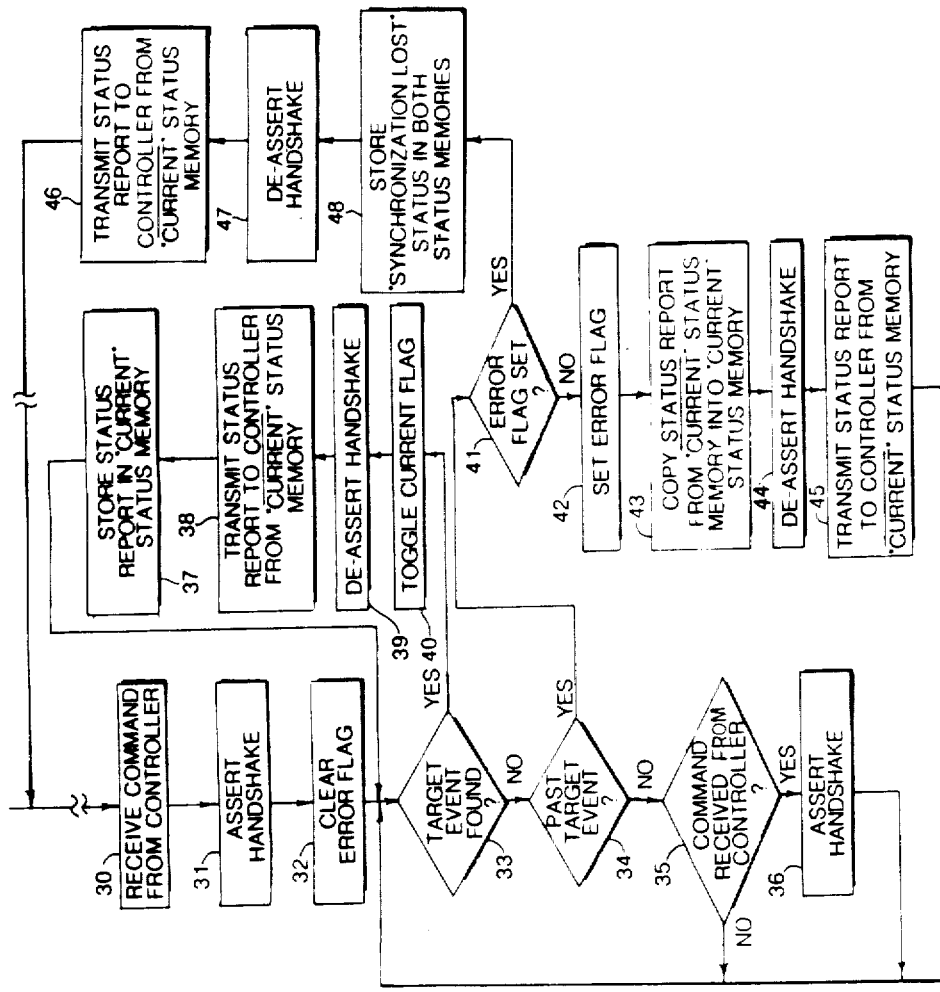
FIG. 6 is a flowchart diagram of the preferred embodiment of a method for recovering from a loss of synchronization in accordance with the present invention.

The detailed operation of the recovery unit 16 shown in FIG. 5 may be understood first with reference to FIG. 6, which is a flowchart diagram illustrating the preferred embodiment of a method for recovering from a loss of synchronization in accordance with the present invention. Referring now to FIGS. 2, 5 and 6, the recovery unit 16 waits to receive a command from the controller 10, as indicated in flowchart step 30. The unit controller 19 then asserts the handshake signal to prevent the controller 10 from immediately sending another command, as shown in step 31. The unit controller 19 then clears the error flag, step 32, in order to initialize the recovery unit 16. Subsequently, the event detector 17 informs the recovery unit 16 when a synchronization event is found. The unit controller 19 must then perform a logical comparison, step 33, to determine whether the synchronization event which has been found is in fact the target event needed to execute the previously received command. The unit controller 19 "knows" in advance which event is the target event since each command contains this information.

If the detected event is not the target event, then the unit controller 19 must determine if the event detector 17 is past the range in which the target event is expected, step 34. Again, since the unit controller 19 knows which event is the target event, it is possible to perform a logical comparison to determine if the detected event is past the target event. If the detected event is in fact past the target event, then a loss of synchronization has occurred and a recovery procedure, as explained below, commences. If the detected event is not past the target event, then the unit controller 19 must determine whether another command has been issued by the controller 10, step 35. If no command is found, the unit controller 19 "loops" to determine whether the target synchronization event has been found by the event detector 17. If a command is found, the unit controller 19 asserts the handshake signal, step 36, and loops to determine whether the target event has been found.

Referring now to step 33 shown in FIG. 6, if the detected event is in fact the target event, then a normal data transfer will commence. However, before the data can be transferred and a corresponding status report stored, the unit controller 19 must toggle the current flag 23, step 40. This toggling is necessary prior to the storage of every status report because the current flag 23 is still pointing to the status memory which received the immediately preceding status report. Recalling that in a queued data transfer a status report for a particular command is not transmitted to the controller until the data transfer for the next succeeding command begins, this "old" status report must be preserved until such transfer commences. Thus, the current flag 23 is toggled to point to the alternate status memory so that the "new" status report will not destroy the "old" status report.

The unit controller 19 then de-asserts the handshake signal, step 39, which allows the data transfer to begin. The unit controller 19 simultaneously transmits to the controller 10 the status report stored in the 37 not current" status memory, step 38. This is the "old" status report which was preserved by virtue of toggling the current flag 23. The unit controller 19 then stores in the "current" status memory the status report corresponding to the data which was just transferred, step 37. This completes a normal data transfer sequence. The unit controller 19 will subsequently loop until another command is found, step 35.

Referring now to step 34 shown in FIG. 6, once it is determined that the detected synchronization event is in fact past the target event, a loss of synchronization has occurred and a recovery procedure begins. The unit controller 19 checks the error flag to determine whether it is set, step 41. If the error flag is not set, then the unit controller 19 sets the error flag, step 42. The unit controller 19 then copies the status report stored in the "not current" status memory into the "current" status memory, step 43. This status report corresponds to the data transfer which immediately preceded the loss of synchronization. The unit controller 19 then de-asserts the handshake signal, step 44. Subsequently, the unit controller 19 transmits to the controller 19 the status report stored in the "not current" status memory, step 45.

Since the same status report is stored in both status memories, it does not matter from which one the report is transmitted. The result is that the controller 10 will receive the correct status report regardless of whether the current flag 23 is correctly oriented. This allows the unit controller 19 to transmit status reports in the same manner whether there is a normal transfer or a loss of synchronization. For example, in both step 38 (normal data transfer sequence) and step 45 (synchronization recovery sequence), the status report is transmitted from the "not current" status memory. The unit controller 19 then loops and returns to step 33 to begin the second "pass" through the synchronization recovery sequence.

A loss of synchronization having already occurred, any synchronization event detected by the event detector 17 will cause the unit controller 19 to determine that such event is not the target event and that the event detector 17 is past the target event, steps 33 and 34. Similarly, the unit controller 19 will determine that the error flag is in fact set, as indicated in step 41, due to the previous execution of step 42. Thus, the error flag 23 serves as an indicator to the unit collector 19 that the status report for the data transfer immediately preceding the loss of synchronization has been transmitted to the controller 10.

The unit controller 19 then stores a "synchronization lost" or other error condition status report in both status memories, step 48. Again, since both status memories contain the same status report, the controller 10 will receive the correct report regardless of the orientation of the current flag 23. The unit controller 19 then de-asserts the handshake signal, step 47, and transmits the status report stored in the "not current" status memory to the controller 10, step 46. This completes the synchronization recovery process.

I claim:

1. An apparatus for recovering from a loss of synchronization in a queued data system, said apparatus comprising:

first memory means for storing one of a first and a second status report;

second memory means, coupled to the first memory means, for storing one of a first and a second status report;

controller means, coupled to the first and second memory means, responsive to a current flag indicating a current one of said first and second memory means, said controller means then being responsive to an instruction received by the queued data system and an accompanying synchronization event for causing one of said first and second status reports to be stored in the current one of said first and second memory means;

error flag means, coupled to the controller means, responsive to a loss of synchronization within the queued data system and operative for indicating a loss of synchronization to the controller means; and current flag means coupled to the controller means, responsive to the occurrence of a preselected synchronization event and operative for indicating to the controller means which of said first and second memory means is current;

said error flag means being responsive to a loss of synchronization for setting an erro flag, said controller means then being operative for retrieving the one of said first and second status reports stored in the one of said first and second memory means that is not current as indicated by said current flag means, said controller means then being operative for causing the one of said first and second status reports indicating a loss of synchronization to be stored in both of said first and second memory means, and said controller means thereafter being operative for retrieving the one of said first and second status reports indicating a loss of synchronization from the one of said first and second memory means that is current as indicated by said current flag means and for then reissuing a precise instruction associated with the loss of synchronization, thereby facilitating recovery of the queued data system from the precise instruction at which the loss of synchronization occurred.

2. The apparatus as in claim 1 wherein said controller means comprises a microprocessor.

3. The apparatus as in claim 1 wherein said first and second memory means comprise random access memories.

4. The apparatus as in claim 1 wherein said first and second memory means comprise registers within a microprocessor.

5. The apparatus of claim 1 wherein said error flag and current flag means comprise random access memories.

6. The apparatus as in claim 1 wherein said error flag and current flag means comprise registers within a microprocessor.

* * * * *